G. E. PALMER.
SEALING DEVICE.
APPLICATION FILED OCT. 11, 1911.
1,014,252.
Patented Jan. 9, 1912.
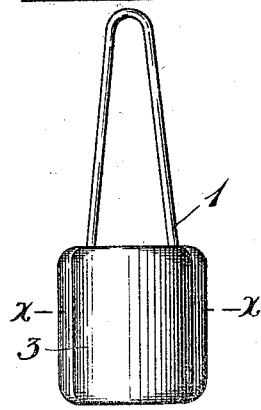
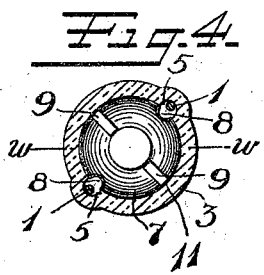
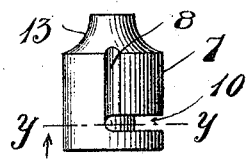
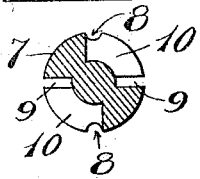
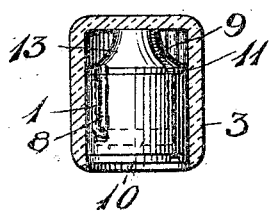
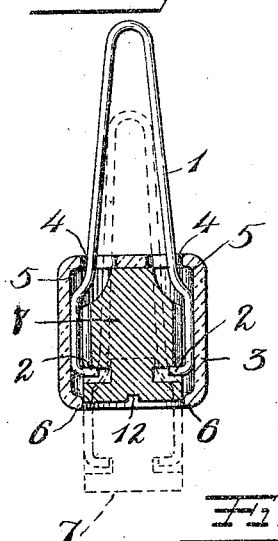
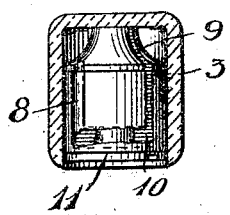
Witnesses:
Inventor
G. E. Palmer
By his Attorneys

UNITED STATES PATENT OFFICE.

GRANVILLE E. PALMER, OF HARTFORD, CONNECTICUT.

SEALING DEVICE.

1,014,252.  Specification of Letters Patent.  Patented Jan. 9, 1912.

Application filed October 11, 1911. Serial No. 654,074.

*To all whom it may concern:*

Be it known that I, GRANVILLE E. PALMER, a citizen of the United States, residing at Hartford, county of Hartford, State of Connecticut, have invented certain new and useful Improvements in Sealing Devices, of which the following is a full, clear, and exact description.

My invention relates to improvements in sealing devices, and has for its object to produce a sealing device having an easily destructible member which may be readily renewed and which is protected against anything except intentional destruction.

A further object of my invention is to provide such a sealing device with a casing which permits of the ready inspection of the destructible member without the opening of the sealing device.

The following is a description of an embodiment of my invention, reference being had to the accompanying drawings, in which—

Figure 1 shows a side elevation of the sealing device. Fig. 2 is a vertical section of the body of the same, with the inner member and seal wire shown in dots partially inserted in the outer member. Fig. 3 is an upward plan view of the device of Fig. 1. Fig. 4 is a plan view of the same, with the casing and wire shown in section on the line $x$—$x$ Fig. 1. Fig. 5 is a side elevation of the inner member. Fig. 6 is a sectional view of the inner member on the line $y$—$y$ Fig. 5. Fig. 7 is a plan view of the outer member. Fig. 8 is a section of the outer member on the line $z$—$z$ Fig. 7. Fig. 9 shows the outer member in section on the line $w$—$w$ Fig. 4, and the inner member with the destructible member thereon in side elevation. Fig. 10 is a similar view showing the destructible member disrupted.

Referring more particularly to the drawings, 1 is a seal wire having lateral inward projections 2.

3 is an outer member having openings 4—4, through which the ends of the seal wire may be introduced. It also has shallow recesses or grooves 5—5 sufficiently deep to receive portions of the seal wire. The casing has abutments 6—6 which extend over one end of the shallow grooves 5—5. The outer member preferably has a substantially cylindrical bore.

7 is an inner member, which may be made of metal, porcelain or the like, and has shallow recesses or grooves 8—8 adapted to register with the grooves 5—5 when the parts are in one position. It also has deep recesses or grooves 9—9 adapted to register with the grooves 5—5 when the inner member is in another position. It also has deep transverse grooves 10—10 connecting one end of each of the grooves 9—9 with the adjacent ends of the shallow grooves 8—8.

11 is a destructible seal secured to the inner member 7 so as to cover either the grooves 9 or the grooves 10, or both of them.

The inner member is preferably revoluble, and in the form shown is a cylinder fitting the bore. The inner member and the bore should, in the preferred form, be sufficiently near to cylindrical so that the inner member will fit fairly closely within the bore and revolve therein. When the inner member is revoluble, the bore and the inner member are preferably, though not necessarily, free from flat sides and also from any taper.

In assembling the seal, the destructible member 11, which is preferably of paper of some not easily obtainable quality or bearing some identification marks, is secured to the inner member 8 by adhesive or otherwise, so as to cover the grooves 9 or 10, or both of them. The seal wire 1 is then introduced into the openings 4 until its free ends 2 pass beyond the abutments 6 a sufficient distance, slightly farther than shown in dots in Fig. 2, so that the inner member 7 can be introduced between them. The inner member is then introduced between the ends of the seal wire, with the shallow grooves 8 in line with the seal wire, the ends of the seal wire being pressed together until the ends 2—2 penetrate the paper and lie within the deep recesses 10. The inner member 7 is then forced upwardly within the casing 3 into the position shown in full lines in Fig. 2. Thereupon the ends of the seal wire spring outward, forming catches which will engage with the abutments 6, thereby preventing the removal of the inner member until the position of the parts has been changed. The inner member is provided with a screw-driver slot 12.

When it is desired to open the seal, a screw-driver is inserted in the slot 12 and the inner member is turned counterclockwise until the deep grooves 9—9 come into alinement with the ends 2—2 of the seal wire. The seal wire can then be pulled upward, the ends 2—2 passing through the deep slots 9—9 and out through the openings 4—4. In revolving the inner member 7, that part of the destructible seal covering the slot 10 is ruptured, and in drawing the ends 2—2 of the seal wire through the deep slot 9—9, the parts of the destructible seal covering the parts 9—9 are ruptured. The parts cannot, therefore, be restored to normal position without leaving evidence of having been opened, and inasmuch as the peculiar paper is supposed to be in the hands of only authorized persons, the fact that the seal has been opened cannot be concealed. The condition of the seal is apparent upon its inspection without disturbing the same, by reason of the fact that the outer member 3 is transparent, thus permitting easy inspection of the destructible seal 11.

The seal wire 1 is made to closely approach the curved portion 13 of the inner member, with the result that the free ends of the seal wire cannot be brought together by pressure sufficiently to permit the inner member 7 from being moved downward past the abutments 6—6.

As will be evident to those skilled in the art, my invention permits of various modifications without departing from the spirit thereof or the scope of the appended claims.

What I claim is:

1. In a device of the character described, the combination of an outer member with a seal wire, a destructible seal, and a movable inner member, the two latter members and the free ends of said seal wire being all within said outer member, said seal wire being in engagement with said destructible seal and with the other two members, said members being locked against separation by the engagement of said wire with said destructible seal.

2. In a device of the character described, the combination of an outer member having a bore, an inner member revoluble within said bore, a destructible seal carried by one of said members, a seal wire engaging both of said members and free to be removed when said members are in one position but locked therein when said members are relatively moved from such position, said seal lying in the path of said wire so as to be ruptured thereby.

3. In a device of the character described, the combination of an inner revoluble member, an outer member having a bore embracing said inner member, one of said members having a shallow recess and the other of said members having a deep longitudinal cut-away portion and a deep transverse cut-away portion, a seal wire having a projection entering said transverse cut-away portion at a point out of alinement with said deep longitudinal cut-away portion, and a destructible seal between said two members covering one of said deep cut-away portions.

4. In a device of the character described, a revoluble inner member, an outer member having a bore and surrounding said inner member, the outer member having a shallow longitudinal recess and said inner member having a deep longitudinal recess and a deep transverse recess, a seal wire having an inward projection entering said transverse recess at a point out of alinement with its intersection with the connected deep longitudinal recess and a destructible seal secured to said inner member and covering one of said deep recesses.

5. In a device of the character described, a revoluble inner member, an outer member having a bore within which said inner member lies, each of said members having a shallow longitudinal recess, said inner member having a deep longitudinal recess, and a deep transverse recess connecting one end of the deep longitudinal recess with the adjacent end of the shallow recess in said inner member, a seal wire having an inward projection entering the transverse recess at a point out of alinement with the deep longitudinal recess connected thereto, and a destructible seal carried by said inner member and covering one of said deep recesses.

GRANVILLE E. PALMER.

Witnesses:
 JANE T. CLARKE,
 FLORENCE L. CLAUSSEN.